United States Patent [19]
Robinson, Jr. et al.

[11] Patent Number: 5,928,371
[45] Date of Patent: Jul. 27, 1999

[54] SYSTEMS FOR PROGRAMMABLY INTERLEAVING AND DE-INTERLEAVING DATA AND METHOD THEREOF

[75] Inventors: Charles D. Robinson, Jr., Pflugerville; Raymond P. Voith; Sujit Sudhaman, both of Austin, all of Tex.

[73] Assignee: Motorola, Inc., Schaumburg, Ill.

[21] Appl. No.: 08/910,475

[22] Filed: Jul. 25, 1997

[51] Int. Cl.[6] .................................................. G06F 11/00
[52] U.S. Cl. .......................... 714/702; 714/762; 714/756; 714/721; 317/5; 317/127
[58] Field of Search .................................... 714/701, 702, 714/756, 762; 370/241; 324/73.1

[56] References Cited

U.S. PATENT DOCUMENTS

5,363,408  11/1994  Paik et al. ................................. 375/39
5,636,224  6/1997  Voith et al. .............................. 371/2.1

*Primary Examiner*—Albert DeCady
*Assistant Examiner*—Esaw Abraham
*Attorney, Agent, or Firm*—Paul J. Polansky

[57] ABSTRACT

A data interleaving system (20) provides flexibility by performing the interleaving function in a high level controller (32) and a separate low level controller (34). The high level controller (32) receives commands to operate on a codeword basis, in which a codeword is made up of a plurality of symbols which are grouped into a programmable number of frames. The low level controller (34) operates under the direction of the high level controller (32) on a symbol-by-symbol basis. By separating the codeword level tasks from the symbol level tasks, the data interleaving system (20) is able to accommodate various ratios of the number of frames per codeword without significant complexity. An analogous data de-interleaving system (220) includes a high level controller (232) and a low level controller (234).

41 Claims, 5 Drawing Sheets

SYSTEMS FOR PROGRAMMABLY INTERLEAVING AND DE-INTERLEAVING DATA AND METHOD THEREOF

CROSS REFERENCE TO RELATED, COPENDING APPLICATIONS

The present invention is related to the following copending applications:

1. "Method and Apparatus for Interleaving Data in an Asymmetric Digital Subscriber Line (ADSL) Transmitter", filed Sep. 30, 1996, Ser. No. 08/723,032, invented by Raymond P. Voith and Sujit Sudhaman and assigned to the assignee hereof; and
2. "Method for Interleave/De-Interleave Addressing in Data Communications Circuits", filed Feb. 10, 1997, Ser. No. 08/797,439, invented by Raymond P. Voith and Sujit Sudhaman and assigned to the assignee hereof.

FIELD OF THE INVENTION

This invention relates generally to communication systems, and more particularly, to digital communications systems which require data interleaving or de-interleaving.

BACKGROUND OF THE INVENTION

In data communications systems such as Asymmetric Digital Subscriber Lines (ADSL), noisy transmission lines can cause data to be corrupted or lost. In order to correct errors and recover lost data, additional error-checking data is often transmitted along with the transmitted data (payload data). The combination of a group of payload data bytes and the error-checking data for the group of payload data bytes is referred to as a codeword. The receiving end of the data transmission can determine if errors have occurred in a particular codeword based on the payload data and error-checking data received. If the amount of error or loss in a codeword is relatively small, the error-checking data can be used to recover the correct payload data.

Bursts of noise on the transmission media may cause the severity of data corruption in a codeword to be such that recovery is not possible. In order to reduce the impact of these bursts of noise, data interleaving techniques can be employed. By interleaving data from different codewords before transmission and de-interleaving the received data at the receiver, the impact of a burst of noise is spread over a number of different codewords, thus reducing the loss in each codeword to a level where recovery of the payload data in each codeword is possible.

The pattern of interleaving is controlled by two parameters. The first is the number of bytes of data in each codeword, which is represented by the number N. The second is the depth of interleaving to be performed, which is represented by the number D. Convolutional interleaving in ADSL requires that each of the N bytes $B_0, B_1, \ldots, B_{N-1}$ in a codeword be delayed by an amount that varies linearly with the byte index. Byte $B_i$ (the byte of the codeword with index i) is delayed by $(D-1)*i$ bytes, where D is the interleave depth.

In order to interleave a data stream, memory is required to store the data from multiple codewords before transmission. If a particular byte is to be delayed by 20 bytes, the particular byte must be stored in memory for the next 20 transmissions before its turn to be transmitted arises. In one prior art technique described in the ADSL standard, data is stored in memory in interleaved form and transmitted when completed interleaved codewords become available. The amount of memory required to perform the interleave function is equal to N*D bytes. It can be seen that as the number of bytes in a codeword and/or the depth of interleaving increases, the amount of memory required to store the interleaved data increases dramatically. Note that an equivalent amount of memory is required in the de-interleaver of the receiver, as data for different codewords will have to be stored until each de-interleaved codeword is complete.

The American National Standards Institute (ANSI) T1E1.4 (ADSL) committee has determined the parameters in an ADSL system regarding the size of each codeword (N) and the depth of interleaving (D). In a particular ADSL example, the size of each codeword (N) may be equal to 255 bytes, and the depth of interleaving (D) equal to 64.

Certain parameters of an ADSL system may be varied by the user, and it is desirable for ADSL transceivers to support these different parameters without adding system cost. One such parameter is the number of frames in a codeword, designated by the variable S. The S value is user selectable and is dependent on the number of payload bytes in a frame and the maximum size of a codeword. As a result of forward error correction, a group of redundancy bytes are added to the S frames of payload data to form a codeword having a length of N bytes, which equals the number of redundancy bytes (R) plus the aggregate number of basic data bytes (K) for the S frames of data. The number of redundancy bytes is chosen to provide a desirable amount of error correction at the receiver. The movement of data bytes during interleaving and de-interleaving occurs in a different order as S varies, adding substantial complexity to the interleaving/de-interleaving task.

What is needed, then, is a method for interleaving and de-interleaving data which may be altered for changes in system parameters without adding significant circuit area. The present invention provides such a method and circuitry which uses this method, and its features and advantages will be more clearly understood from the following detailed description taken in conjunction with the accompanying drawings.

DETAILED DESCRIPTION OF A PREFERRED EMBODIMENT

Figure 1:
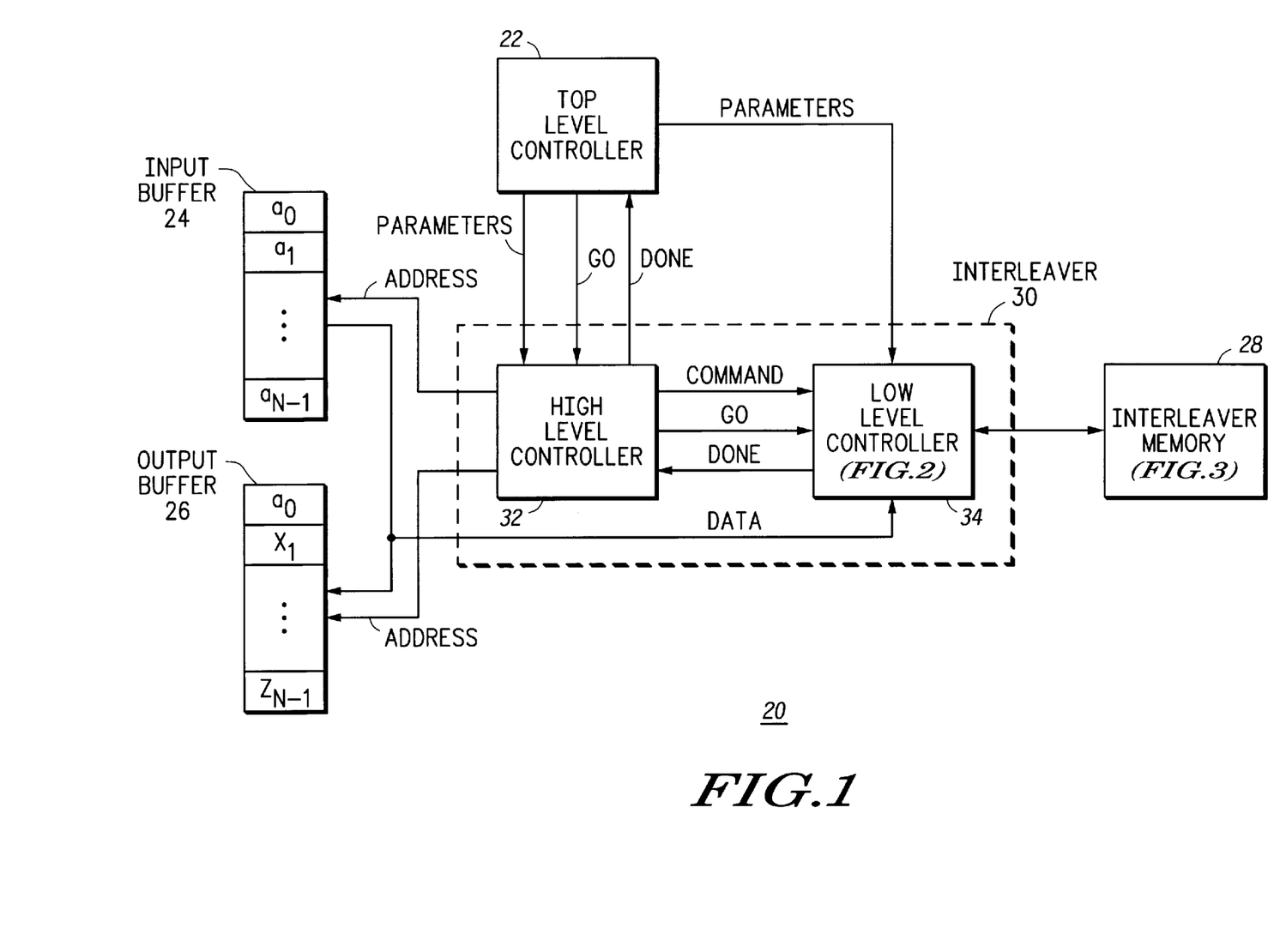
FIG. 1 illustrates in block diagram form a data interleaving system including an interleaver according to the present invention.

FIG. 1 illustrates in block diagram form a data interleaving system 20 including an interleaver 30 according to the present invention. Data interleaving system 20 includes generally a top level controller 22, an input buffer 24, an output buffer 26, an interleaver memory 28, and interleaver 30. Top level controller 22 controls interleaver 30 to perform an interleaving operation on a codeword associated with data interleaving system 20. Top level controller 22 outputs values labelled "PARAMETERS" to each of two portions of interleaver 30 which will be described in further detail below. Top level controller 22 also has an output for providing a control signal labeled "GO" and an input for receiving a control signal labeled "DONE". In the illustrated embodiment, data interleaving system 20 is part of an ADSL signal processing system in which input buffer 24 is filled during another signal processing function. In other signal processing systems top level controller 22 may write data directly into input buffer 24.

Input buffer 24 is a set of N contiguous memory locations where N is a parameter corresponding to the number of symbols in a single codeword. In generally, N is of arbitrary size, but in the example of an ADSL system could assume a value between zero and 255. Each of the N symbols in the illustrated embodiment represents a single byte of data and is labeled $a_i$, where i corresponds to the order of the symbol in input buffer 24. Input buffer 24 has an input for receiving an address value labelled "ADDRESS" to indicate which symbol is selected, and an output for providing the symbol data labelled "DATA" addressed by the ADDRESS.

Output buffer 26 includes the same number of symbols N present in input buffer 24. Output buffer 26 has a first input for receiving an address also labelled "ADDRESS", and a second input for receiving symbol data also labelled "DATA". Unlike input buffer 24, however, the symbols in output buffer 26 are interleaved. Thus, as would be the case in an ADSL system, the first symbol is similarly labeled "$a_0$" and corresponds to the first symbol in input buffer 24. However, the second symbol does not correspond to "$a_1$" but is symbol data from a prior frame and is labeled labelled "$x_1$". The last symbol is from a different prior frame and is labelled "$z_{N-1}$". Note that the present invention is not limited to ADSL systems and thus the particular interleaving technique will vary from embodiment to embodiment. Note also that in data interleaving system 20, input buffer 24 and output buffer 26 are preferably implemented using the same physical buffer. When input buffer 24 and output buffer 26 are implemented using the same physical buffer, there are important ramifications for the interleaving operation which will be described further below.

Interleaver memory 28 is a scratchpad memory for use by interleaver 30 so that interleaver 30 may read data from input buffer 24 and output data to output buffer 26 using the desired interleaving algorithm. Interleaver memory 28 has a bidirectional connection to interleaver 30 for conducting control, address, and data signals therebetween. Interleaver memory 28 will be further described with reference to FIG. 3 below.

According to the present invention, the interleaving operation is advantageously separated into two distinct operations in order to provide flexibility when system parameters are varied by the user. Interleaver 30 includes a high level controller 32 and a low level controller 34. High level controller 32 has a first control input connected to top level controller 22 for receiving the PARAMETERS therefrom, a second control input for receiving signal "GO" from top level controller 22, and a first control output for providing signal "DONE" to top level controller 22. High level controller 32 also has outputs for providing an ADDRESS to each of input buffer 24 and output buffer 26. Note that these ADDRESSes will be a common signal if input buffer 24 and output buffer 26 are implemented by the same physical buffer. High level controller 32 has a second control output for providing a signal labelled "COMMAND", a third control output for providing a signal labelled "GO", and a third control input for receiving a signal labelled "DONE", all connected to low level controller 34. In addition to being connected to these signals, low level controller 34 also has a control input for receiving the PARAMETERS from top level controller 22, a bi-directional data connection for conducting DATA between input buffer 24 and output buffer 26, and a bi-directional connection to interleaver memory 28 for conducting the address, data, and control signals.

In overall operation, the data to be interleaved is present in input buffer 24. Interleaver 30 reads this data and uses interleaver memory 28 as a storage area to perform the delay required by the interleaving operation. The interleaved data is then output to output buffer 26 for subsequent processing and transmission. Top level controller 22 provides PARAMETERS to high level controller 32 and low level controller 34 for operation upon data within a codeword of data. In order to effectuate the interleaving of a codeword, top level controller 22 provides parameters to high level controller 32 on a frame-by-frame basis. These parameters include the following quantities: a parameter labelled "W" which represents the number of write cycles to be performed in the given frame, a parameter labelled "W-R" which represents the number of write followed by read cycles to be performed during the interleaving of the frame, and parameter labelled "R" which represents the number of read only operations to be performed during the frame. High level controller 32 proceeds to issue commands to low level controller 34 on a symbol basis, to process symbols one at a time until the number of operations specified in the PARAMETERS received from top level controller 22 has been completed. Thus, the COMMAND output by high level controller 32 includes either a write command, a write-read command, or a read command and is interpreted as a primitive symbol command by low level controller 34. In general high level controller 32 provides control on a frame-by-frame basis whereas low level controller 34 provides operations on a symbol-by-symbol basis. This division of functions into two distinct controllers provides flexibility by allowing the user to vary the ADSL parameter S without requiring additional circuit complexity.

Figure 2:
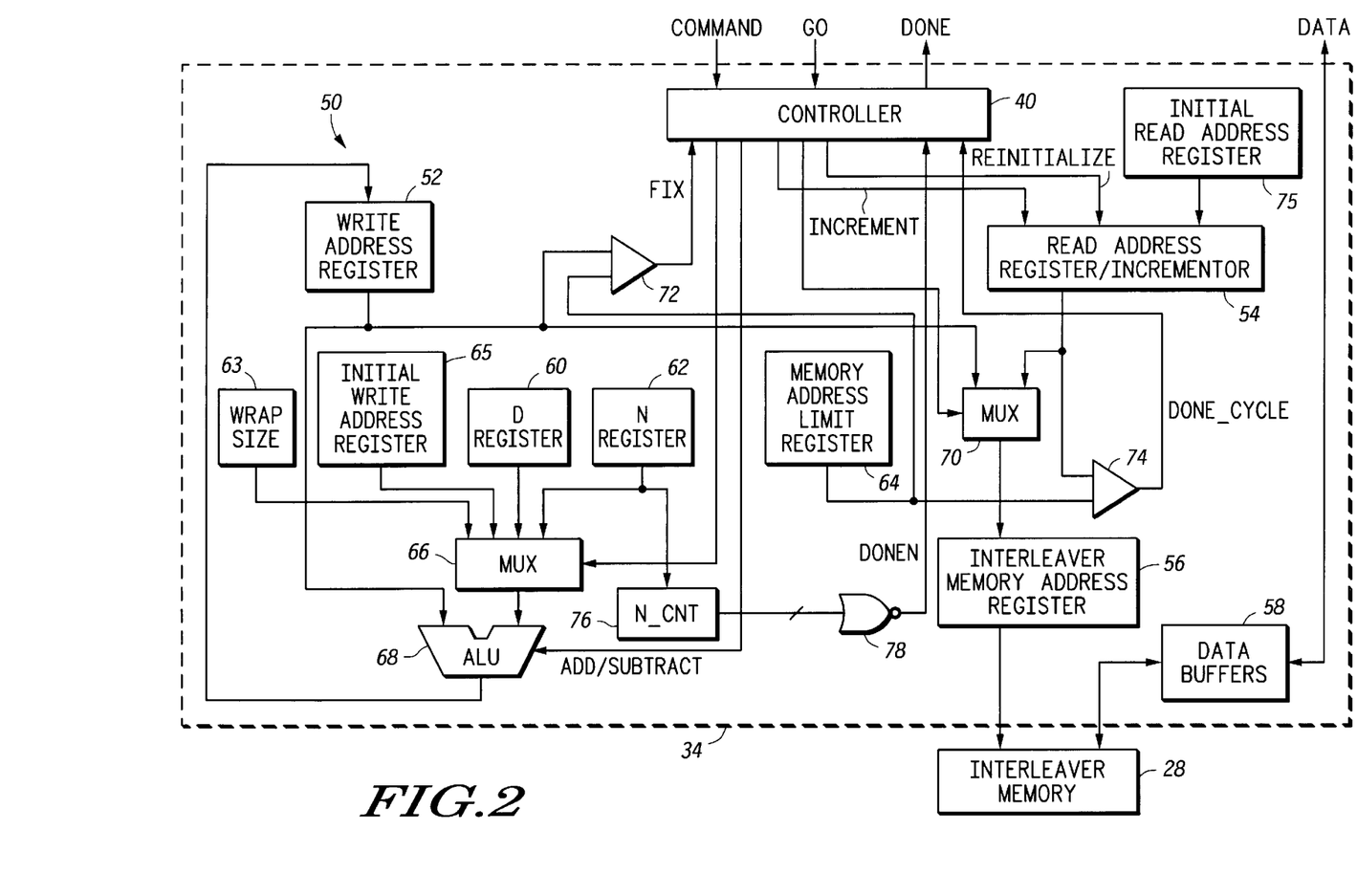
FIG. 2 illustrates in partial block diagram and partial logic diagram form the low level controller of FIG. 1.

FIG. 2 illustrates in partial block diagram and partial logic diagram form low level controller 34 of FIG. 1. Also illustrated in FIG. 2 is interleaver memory 28. Low level controller 34 includes generally a controller 40 and a data path 50. Controller 40 has inputs for receiving control signals COMMAND and GO from high level controller 32, and an output for providing the DONE signal to high level controller 32. In addition, controller 40 has control inputs and outputs which will be further described with reference to data path 50, as well as other timing and control inputs and outputs which are omitted from FIG. 2 to facilitate understanding of the present invention.

Data path 50 includes generally a write address register 52, a read address register/incrementor 54, an interleaver memory address register 56, data buffers 58, a D register 60, an N register 62, a wrap size register 63, a memory address limit register 64, an initial write address register 65, a multiplexor (MUX) 66, an arithmetic logic unit (ALU) 68, a MUX 70, a comparator 72, a comparator 74, an initial read address register 75, a counter labeled "N_CNT" 76, and a NOR gate 78. Write address register 52 has an input, and an output for providing a WRITE ADDRESS which is the address used by data path 50 when performing a write operation. Read address register/incrementor 54 has a first input, a first control input for receiving a control signal labeled "INCREMENT", a second control input for receiving a control signal labeled "REINITIALIZE", and an output for providing a READ ADDRESS which is the address used by data path 50 when performing a read operation. Interleaver memory address register 56 has an input, and an output connected to interleaver memory 28. Data buffers 58 have a bidirectional connection to interleaver memory 28 and a bidirectional terminal for conducting the DATA signals.

Data path 50 includes five registers for storing corresponding PARAMETERS received from top level controller 22, including registers 60, 62, 63, 64, and 65. Register 60 stores the D PARAMETER, register 62 stores the N PARAMETER, register 63 stores a PARAMETER labelled "WRAP SIZE", register 64 stores a PARAMETER labelled "MEMORY ADDRESS LIMIT", and register 65 stores a PARAMETER labelled "INITIAL WRITE ADDRESS". Each of registers 60, 62, 63, and 65 has an output connected to a corresponding input of MUX 66. MUX 66 also has a control input connected to an output of controller 40, and an output terminal. ALU 68 has a first input terminal connected to the output terminal of write address register 52, a second input terminal connected to the output terminal of MUX 66, a control terminal connected to an output terminal of controller 40 for receiving a signal labeled "ADD/SUBTRACT", and an output terminal connected to the input terminal of write address register 52.

MUX 70 has a first input terminal connected to the output terminal of write address register 52, a second input terminal connected to the output terminal of read address register/incrementor 54, a control input terminal connected to an output of controller 40, and an output terminal connected to the input terminal of interleaver memory address register 56. Comparator 72 has a first input terminal connected to the output terminal of write address register 52, a second input terminal connected to the output terminal of register 64, and an output terminal for providing a signal labeled "FIX". Comparator 74 has a first input terminal connected to the output terminal of read address register/incrementor 54, a second input terminal connected to the output terminal of register 64, and an output terminal connected to an input terminal of controller 40 for providing a control signal labeled "DONE_CYCLE". N_CNT 76 has an input terminal connected to the output terminal of register 62, and an output terminal for providing a multi-bit counter output signal. NOR gate 78 has input terminals connected to corresponding outputs of N counter N_CNT 76, and an output terminal connected to an input of controller 40 for providing a signal labeled "DONEN".

In operation, controller 40 receives commands which are analogous to primitive commands which allow it to do interleaving operations independently from high level controller 32. In the illustrated embodiment, controller 40 responds to three commands: a write command ("W"), a write followed by read command ("W-R"), and a read command (R). These commands are used in processing ADSL codewords in a manner which will become more apparent in the following description. In general, however, controller 40 may respond to any arbitrary command which is a primitive type command useful in the interleaving operation being employed. Thus, the commands are not limited to these enumerated commands, nor is the order or combination of the commands limited to the illustrated embodiment.

In response to a write command or the write portion of a write-read command, controller 40 causes data path 50 to place the contents of write address register 52 in internal interleaver memory address register 56 by enabling the first input of MUX 70, and to decrement the value of N_CNT 76. In addition, data path 50 updates the value in write address register 52. The update is performed according to the following algorithm (expressed in equivalent pseudocode form):

```
begin                                                [1]
    WADD_J = WADD_{J-1} + D
    N_CNT = N_CNT - 1 if (WADDJ > MEMORY ADDRESS LIMIT)
        WADD_J = WADD_J - WRAP SIZE
    endif if (N_CNT == 0)
        WADD_J = WADD_J + N
    endif if (WADD_J > MEMORY ADDRESS LIMIT)
        WADD_J = WADD_J - WRAP SIZE
    endif
end
``` where J represents the next address and J−1 represents the present address.

Now the elements which perform this algorithm will be briefly described. Register 65 stores an INITIAL WRITE ADDRESS, which may be any arbitrary value, and controller 40 activates MUX 66 to select the corresponding input thereof which is then output directly by ALU 68 to be input into write address register 52 during initialization. During an address update, controller 40 causes MUX 66 to select the D input so that the WRITE ADDRESS is incremented by the value of D. Controller 40 decrements N_CNT 76 by one. Comparator 72 then determines whether the updated memory address exceeds the MEMORY ADDRESS LIMIT and if so, controller 40 causes MUX 66 to select the WRAP SIZE input and to enable ALU 68 for subtraction. If NOR gate 78 detects that all bits of N_CNT 76 are zero, then controller 40 causes MUX 66 to select the N input to add to the WRITE ADDRESS. Finally if after this update comparator 72 detects that the WRITE ADDRESS exceeds the MEMORY ADDRESS LIMIT, controller 40 enables MUX 66 to select the WRAP SIZE input and to enable ALU 68 for subtraction to bring the WRITE ADDRESS back within the bounds of interleaver memory 28.

In response to a read command or the read portion of a write-read command, controller 40 causes MUX 70 to select the second input thereof causing the read address to be loaded into interleaver memory address register 56. In addition, data path 50 updates the value in read address register/incrementor 54. The update is performed according to the following equation:

$$RADD_J = (RADD_{J-1} + 1)_{MOD(N \cdot D)} \qquad [2]$$

where as before J represents the next address, J−1 the present address, and MOD represents the modulus operation.

Register 75 stores an INITIAL READ ADDRESS, which may be any arbitrary value (but equal to the INITIAL WRITE ADDRESS), and controller 40 causes the value stored in register 75 to be loaded into read address register/incrementor 54 by activating signal REINITIALIZE during initialization. Comparator 74 determines whether the READ ADDRESS has reached the modulo limit by comparing it to the value stored in memory address limit register 64, and activates the DONE_CYCLE signal when it exceeds the MEMORY ADDRESS LIMIT. After a cycle, controller 40 activates signal INCREMENT to read address register/incrementor 54 to increment the value stored therein. In response to an activation of DONE_CYCLE, however, controller 40 subsequently activates signal REINITIALIZE to cause read address register/incrementor 54 to be reset to point to the first location in interleaver memory 28.

Note that advantageously the starting value of interleaver memory 28 may be located at address $0. In this case, initial write address register 65 and initial read address register 75 are not needed because the respective initial addresses will be $0. Note also that other known modulo adders which are capable of performing these operations may be used as well.

Figure 3:
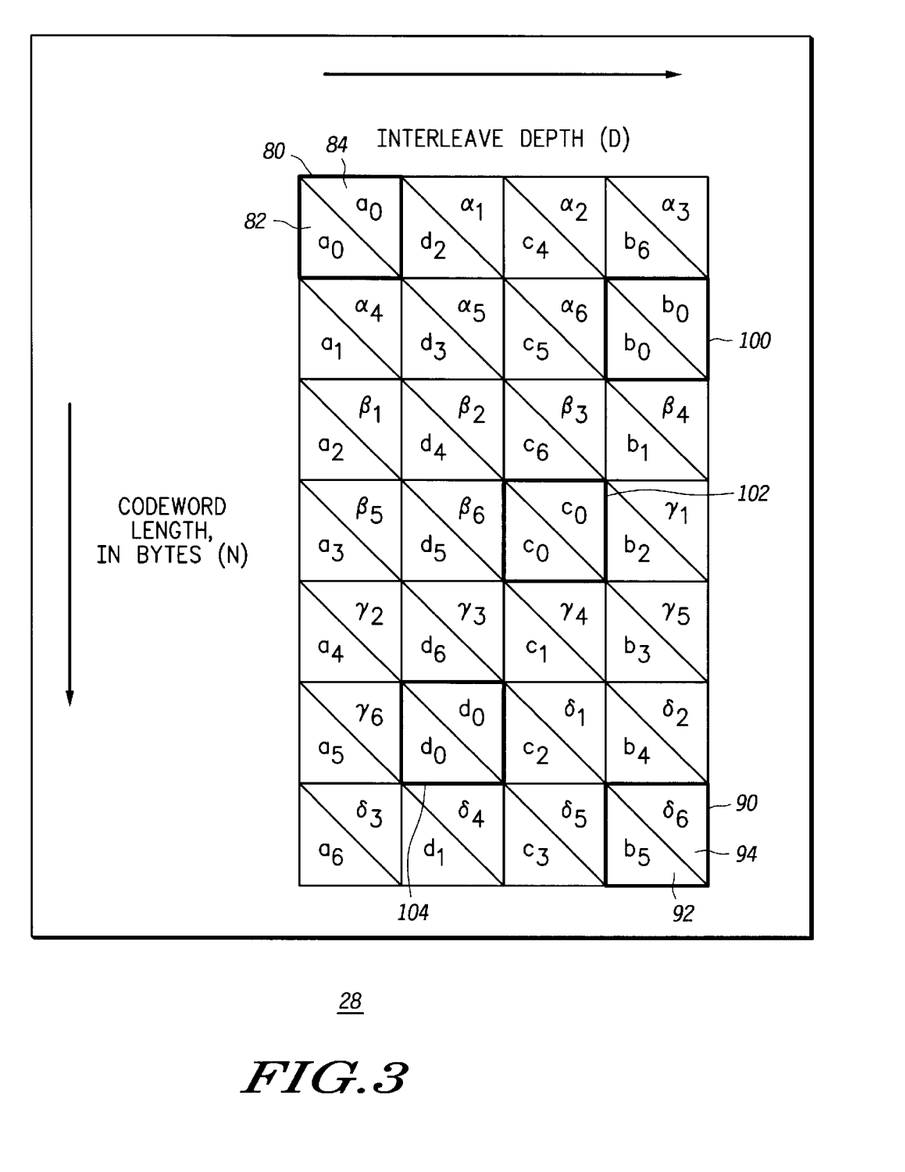
FIG. 3 illustrates a block diagram of the interleaver memory of FIG. 1.

FIG. 3 illustrates a block diagram of interleaver memory 28 of FIG. 1. Interleaver memory 28 includes N*D memory locations. In the example illustrated in FIG. 3, N=7 and D=4 and thus interleaver memory 28 includes 28 locations. For example, memory location 80 is the first address in interleaver memory 28. FIG. 3 illustrates that corresponding to memory location 80 is a first value 82 labeled "$a_0$" and a second value 84 also labeled "$a_0$". Value 82 in the lower left corner represents the write value and value 84 in the upper right corner represents the read value. Also shown in FIG. 3 is memory location 90 which is the last address in interleaver memory 28 and includes a write portion 92 for storing symbol labeled "$b_5$" and a read portion 94 for storing a read symbol labeled "$\delta_6$". Also illustrated in FIG. 3 are three additional memory elements, 100, 102, and 104, which represent memory locations in interleaver memory 28 which have a significance which will be explained further below.

FIG. 3 is useful in understanding how interleaver 30 writes data into and reads data from interleaver memory 28. Note that in general, sequential write cycles occur column wise and sequential read cycles occur on an incremental basis from low order to high order addresses in interleaver memory 28. Thus, within codeword a, write addresses are incremented by 4 (D) with appropriate checks. When all of codeword a has been written into interleaver memory 28, interleaver 30 begins writing codeword b at location 100. The reason why the first byte of codeword b ($b_0$) is stored at location 100 is that by the time the seven bytes of codeword a have been stored in interleaver memory 28, seven values have also been read and it is time to write and read $b_0$ at the same location. Note that the values $\alpha 1-\alpha 6$ may represent bytes of present or previous codewords which are interleaved according to the ADSL interleaving system or may represent non-useful data at the beginning of the interleaving sequence. After symbol $b_0$ has been written into location 100, additional symbols $b_1-b_6$ are stored by adding four to the write address and appropriately adjusting the address. Similarly, after codeword b has been stored in interleaver memory 28, codeword c begins at location 102 and likewise proceeds. Codeword d begins at memory location 104 and also likewise proceeds. At the end of writing all of codeword D and interleaver memory 28, four codewords have been written into interleaver memory 28 in the prescribed interleaving fashion. Thus, after completion of writing codeword d, valid data resides in all locations of interleaver memory 28 such that subsequent reading operations will fetch the data for placement into output buffer 26 for correct transmission according to the ADSL interleaving scheme, and the process begins again at location 80.

Figure 4:
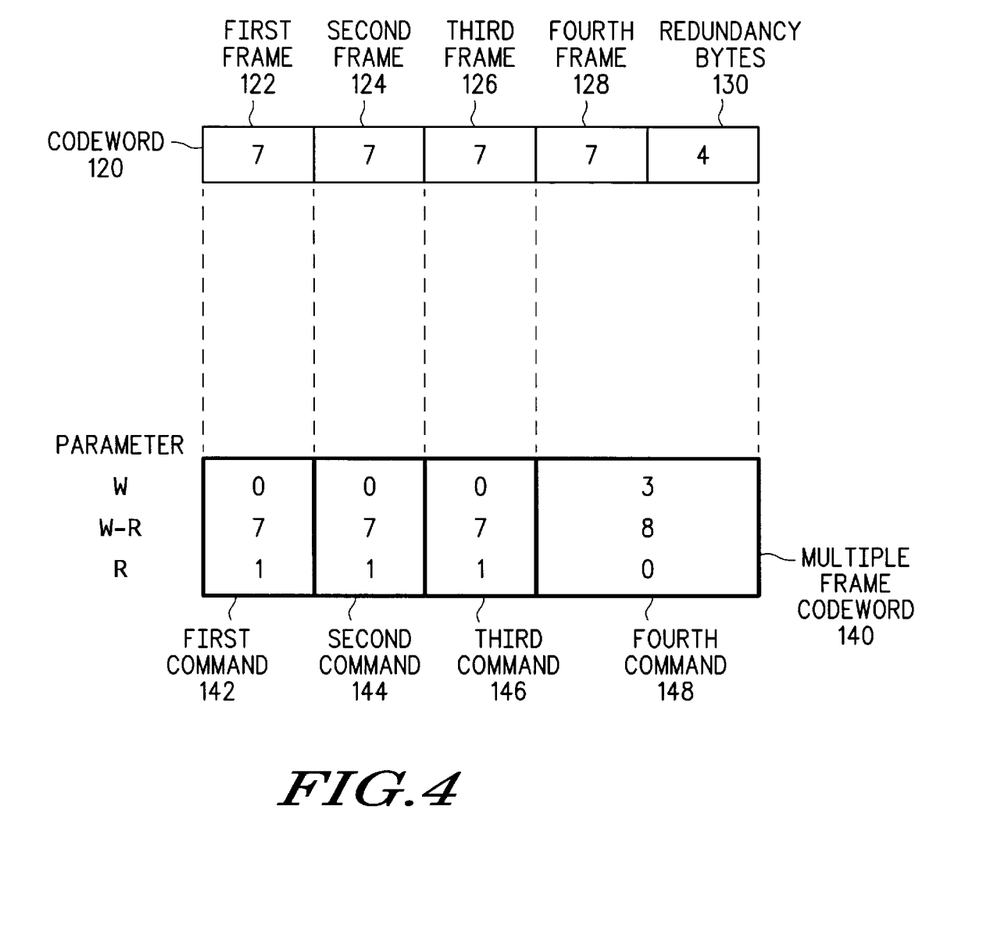
FIG. 4 illustrates a conceptual diagram of a multiple frame codeword which illustrates the flexibility of the present invention.

FIG. 4 illustrates a conceptual diagram of a multiple frame codeword which illustrates the flexibility of the present invention. Shown in FIG. 4 is a codeword 120 which includes four frames including a first frame 122, a second frame 124, and third frame 126, and a fourth frame 128. At the end of the four frames in codeword 120 are four redundancy bytes 130 which allow recovery from a noise burst if such a noise burst corrupts data during transmission. Codeword 120 has a size of 32 bytes of which 28 bytes are payload and 4 bytes are redundancy bytes. As illustrated in FIG. 4, the number of frames per codeword (S) is equal to 4. In the example shown in FIG. 4, interleaver 30 is able to support such codeword parameters flexibly by allowing high level controller 32 to dispatch appropriate sequences of commands to low level controller 34 to accommodate the codeword. As illustrated in FIG. 4, corresponding to first frame 122 top level controller 22 passes the parameters W, W-R, and R as 0, 7 and 1 respectively to form a first command 142 to high level controller 32. Thus, corresponding to the first frame, interleaver 30 performs seven write cycles and eight read cycles. Similarly, during second frame 124, top level controller 22 passes parameters W, W-R, and R as 0, 7 and 1 to form second command 144 to high level controller 132 and similarly the parameters W, W-R, and R are equal to 0, 7 and 1 for a third command 146. By the completion of the interleaving operation on third frame 126, twenty-one writes have been performed, but twenty-four reads have been performed. Thus, corresponding to fourth frame 128 and redundancy bytes 130 are three additional write cycles and eight write-read cycles such that by the end of the sequence of commands provided to high level controller by top level controller 22 the number of writes is equal to the number of reads. By partitioning interleaver 30 into a high level controller and a low level controller, interleaver 30 is able to flexibly accommodate different values of S without redesign.

In general, the PARAMETERS N and D are required to be relatively coprime. However, the two-level structure of interleaver 30 allows this requirement to be facilitated. For example, the ADSL standard defines D as a power of two. In order to ensure that N and D are relatively coprime, N could not be an even number. In order to accommodate even values of data (M, =payload+redundancy bytes), top level controller 22 informs high level controller 32 that there are N bytes and one dummy byte. High level controller 32 then issues COMMANDS to low level controller 34 to read the dummy byte and place it in interleaver memory 28. Low level controller 34 subsequently reads the dummy byte back from interleaver memory 28 and delivers it to high level controller 32. However high level controller 32 then ignores the dummy byte. Note that the ability to insert one or more dummy bytes may be used to further enhance the capability of interleaver 30 to handle special or non-standard buffer sizes.

Figure 5:
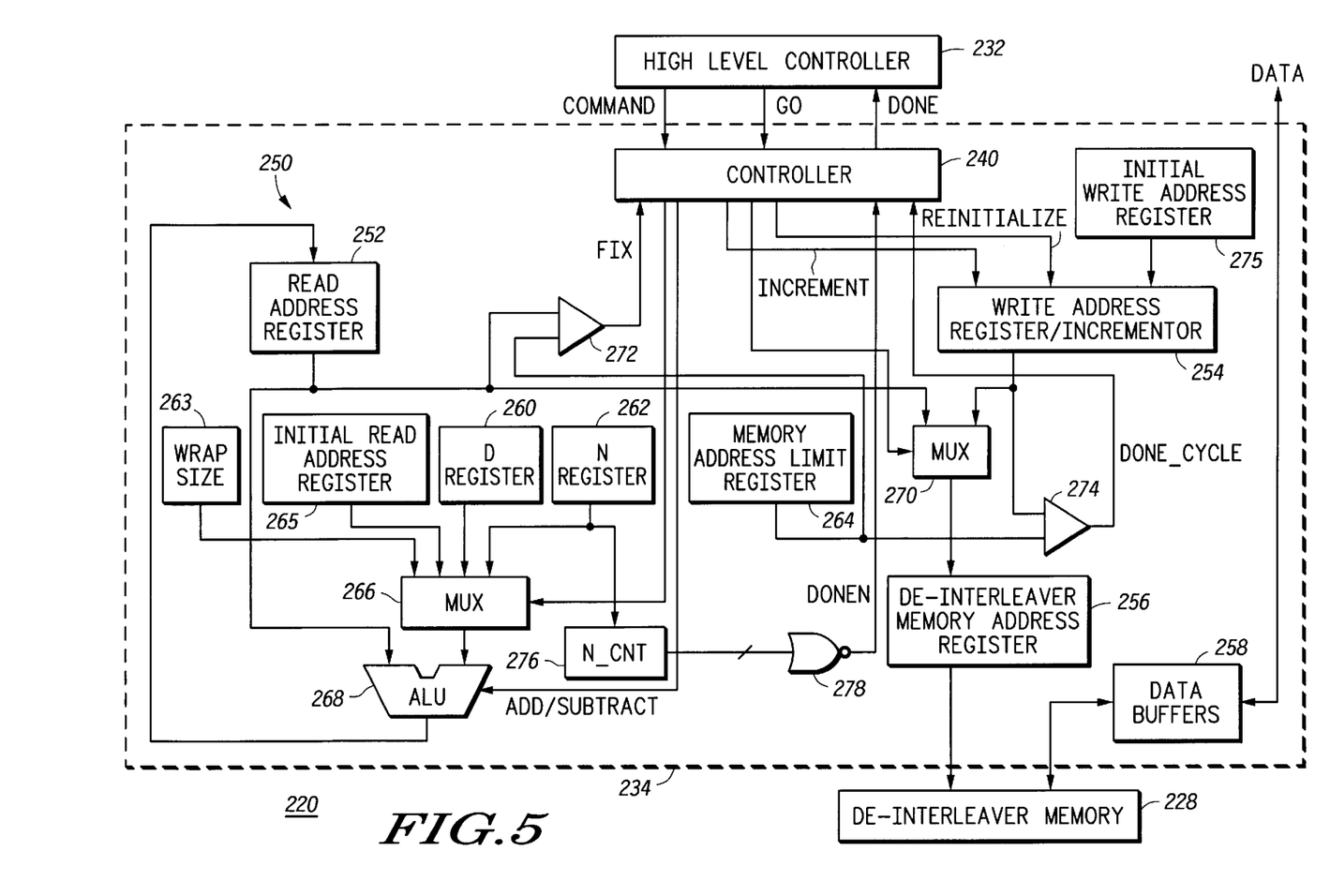
FIG. 5 illustrates in partial block diagram and partial logic diagram form a data de-interleaving system according to the present invention.

FIG. 5 illustrates in partial block diagram and partial logic diagram form a data de-interleaving system 220 according to the present invention. Data de-interleaving system 220 includes a high level controller 232, a low level controller 234, and a de-interleaver memory 228. High level controller 232 has the same set of control input and output signals as high level controller 32 of FIG. 1. Low level controller 234 is substantially a mirror image of low level controller 34 of FIG. 2 and corresponding elements have been assigned corresponding reference numbers in FIG. 5.

Low level controller 234 is adapted for use with a de-interleaver memory 228, which may be contiguous with interleaver memory 28. Low level controller 234 includes generally a controller 240 and a data path 250. Controller 240 has inputs for receiving control signals COMMAND and GO from high level controller 232, and an output for providing the DONE signal. Low level controller 234 has control inputs and outputs which will be further described with reference to data path 250, as well as other timing and control inputs and outputs which are omitted from FIG. 5 to facilitate understanding of the present invention.

Data path 250 includes generally a read address register 252, a write address register/incrementor 254, a de-interleaver memory address register 256, data buffers 258, a D register 260, an N register 262, a wrap size register 263, a memory address limit register 264, an initial read address register 265, a MUX 266, an ALU 268, a MUX 270, a comparator 272, a comparator 274, an initial write address register 275, a counter labeled "N_CNT" 276, and a NOR gate 278. Read address register 252 has an input, and an output for providing a READ ADDRESS which is the address used by data path 250 when performing a read operation. Write address register/incrementor 254 has a first input, a first control input for receiving a control signal labeled "INCREMENT", a second control input for receiving a control signal labeled "REINITIALIZE", and an output for providing a WRITE ADDRESS which is the address used by data path 250 when performing a write operation. De-interleaver memory address register 256 has an input, and an output connected to de-interleaver memory 228. Data buffers 258 have a bidirectional connection to de-interleaver memory 228 and a bidirectional terminal for providing the DATA signals.

Data path 250 includes five registers for storing corresponding PARAMETERS received from the top level controller, including registers 260, 262, 263, 264, and 265. Register 260 stores the D PARAMETER, register 262 stores the N PARAMETER, register 263 stores the WRAP SIZE PARAMETER, register 264 stores the MEMORY ADDRESS LIMIT PARAMETER, and register 265 stores the INITIAL READ ADDRESS PARAMTER. Each of registers 260, 262, 263, and 265 has an output connected to a corresponding input of MUX 266. MUX 266 also has a control input connected to an output of controller 240, and an output terminal. ALU 268 has a first input terminal connected to the output terminal of read address register 252, a second input terminal connected to the output terminal of MUX 266, a control terminal connected to an output terminal of controller 240 for receiving a signal labeled "ADD/SUBTRACT", and an output terminal connected to the input terminal of read address register 252.

MUX 270 has a first input terminal connected to the output terminal of read address register 252, a second input terminal connected to the output terminal of write address register/incrementor 254, a control input terminal connected to an output terminal of controller 240, and an output terminal connected to the input terminal of de-interleaver memory address register 256. Comparator 272 has a first input terminal connected to the output terminal of read address register 252, a second input terminal connected to the output terminal of register 264, and an output terminal for providing a signal labeled "FIX". Comparator 274 has a first input terminal connected to the output terminal of write address register/incrementor 254, a second input terminal connected to the output terminal of register 264, and an output terminal connected to an input terminal of controller 240 for providing a control signal labeled "DONE_CYCLE". N_CNT 276 has an input terminal connected to the output terminal of register 262, and an output terminal for providing a multi-bit counter output signal. NOR gate 278 has input terminals connected to corresponding outputs of N_CNT 276, and an output terminal connected to an input of controller 240 for providing a signal labeled "DONEN".

Like controller 40, controller 240 also receives primitive commands which allow it to do interleaving operations independently from the high level controller. In the illustrated embodiment, controller 240 responds to the command write-read. This command is used in de-interleaving ADSL codewords. Like controller 40 of FIG. 2, controller 240 may respond to any arbitrary primitive command useful in the de-interleaving operation being employed.

In response to the write portion of a write-read command, controller 240 first causes MUX 270 to select the second input thereof causing the WRITE ADDRESS to be loaded into de-interleaver memory address register 256. In addition, data path 250 updates the value in write address register/incrementor 254. The update is performed according to the following equation:

$$WADD_J = (WADD_{J-1} + 1)_{MOD(N \cdot D)} \qquad [3]$$

where as before J represents the next address, J–1 the present address, and MOD represents the modulus operation. The INITIAL READ ADDRESS is related to the INITIAL WRITE ADDRESS by the following equation:

$$\text{INITIAL READ ADDRESS} = \text{INITIAL WRITE ADDRESS} + N + (D-1) - [(D-1)_{MOD N}] \qquad [4]$$

In response to read portion of a write-read command, controller 240 subsequently causes data path 250 to place the contents of read address register 252 in internal de-interleaver memory address register 256 by enabling the first input of MUX 270. In addition, data path 250 updates the value in read address register 252. The update is performed according to the following algorithm (expressed in equivalent pseudo-code form):

$$
\begin{aligned}
&\text{begin} \qquad\qquad\qquad\qquad\qquad\qquad\qquad\qquad [5]\\
&\quad RADD_J = RADD_{J-1} + D\\
&\quad N\_CNT = N\_CNT - 1\\
\\
&\quad \text{if } (RADD_J > \text{MEMORY ADDRESS LIMIT})\\
&\quad\quad RADD_J = RADD_J - \text{WRAP SIZE}\\
&\quad \text{endif}\\
\\
&\quad \text{if } (N\_CNT == 0)\\
&\quad\quad RADD_J = RADD_J + N)\\
&\quad \text{endif}\\
\\
&\quad \text{if } (RADD_J > \text{MEMORY ADDRESS LIMIT})\\
&\quad\quad RADD_J = RADD_J - \text{WRAP SIZE}\\
&\quad \text{endif}\\
&\text{end}
\end{aligned}
$$

where as before J represents the next address and J–1 represents the present address.

Now the elements which perform this algorithm will be briefly described. Register 265 stores an INITIAL READ ADDRESS, which may be any arbitrary value, and controller 240 activates MUX 266 to select the corresponding input thereof which is then output directly by ALU 268 to be input into read address register 252 during initialization. During an address update, controller 240 causes MUX 266 to select the D input so that the READ ADDRESS is incremented by the value of D. Controller 240 decrements N_CNT 276 by one. Comparator 272 then determines whether the updated memory address exceeds the MEMORY ADDRESS LIMIT and if so, controller 240 causes MUX 266 to select the WRAP SIZE input and to enable ALU 268 for subtraction. If NOR gate 278 detects that all bits of N_CNT 276 are zero, then controller 240 causes MUX 266 to select the N input to add to the READ ADDRESS. Finally if after this update comparator 272 detects that the READ ADDRESS exceeds the MEMORY ADDRESS LIMIT, controller 240 enables MUX 266 to select the WRAP SIZE input and to enable ALU 268 for subtraction to bring the READ ADDRESS back within the bounds of de-interleaver memory 228.

Register 275 stores an INITIAL WRITE ADDRESS, which may be any arbitrary value, and controller 240 causes the value stored in register 275 to be loaded into write address register/incrementor 254 by activating signal REINITIALIZE during initialization. Comparator 274 determines whether the write address register has reached the modulo limit by comparing it to the value stored in memory address limit register 264, and activates the DONE_CYCLE signal when it reaches the MEMORY ADDRESS LIMIT. After a cycle controller 240 activates signal INCREMENT to write address register/incrementor 254 to increment the value stored therein. In response to an activation of DONE_CYCLE, however, controller 240 subsequently activates signal REINITIALIZE to cause write address register/incrementor 254 to be reset to point to the first location in de-interleaver memory 228.

While the invention has been described in the context of a preferred embodiment, it will be apparent to those skilled in the art that the present invention may be modified in numerous ways and may assume many embodiments other than that specifically set out and described above. For example while the interleaver and de-interleaver were illustrated in the context of an ADSL system, it should be apparent that they are applicable to other communications standards which use interleaving and de-interleaving. Accordingly, it is intended by the appended claims to cover all modifications of the invention which fall within the true scope of the invention.

What is claimed is:

1. A system for programmably interleaving communications data that separates interleaving operations at a codeword level from interleaving operations at a symbol level, wherein:
   a codeword is an ordered grouping of N symbols to be interleaved to a depth of D;
said system comprising:
   a high level interleaver that is responsive to a set of high level interleaving signals, that is controlled by a set of high level interleaving parameters, and which works at the codeword level; and
   a low level interleaver that is responsive to a set of low level interleaving signals provided by the high level interleaver, that is controlled by a set of low level interleaving parameters, and which works at the symbol level.

2. The system in claim 1 which further comprises:
   an interleaver memory that is written by and read from the low level interleaver.

3. The system in claim 1 which further comprises:
   a top level controller that provides the set of high level interleaving signals to the high level interleaver.

4. The system in claim 1 which further comprises:
   an interleaver input buffer that is read by the high level interleaver; and
   an interleaver output buffer that is written by the high level interleaver.

5. The system in claim 4 wherein the interleaver input buffer is a same buffer as the interleaver output buffer.

6. The system in claim 1 wherein:
   the set of low level interleaving signals comprise:
      a low level interleaver read signal,
      a low level interleaver write signal, and
      a low level interleaver go signal to activate the low level interleaver; and
   the low level interleaver provides a low level interleaver done signal to the high level interleaver when it completes.

7. The system in claim 1 wherein:
   the set of low level interleaving parameters comprises:
      an interleaver buffer address,
      an interleaving codeword size N,
      an interleaving depth D, and
      an interleaver memory address limit; and
   the set of low level interleaving signals comprises:
      a low level go signal to activate the low level interleaver.

8. The system in claim 1 wherein:
   the set of high level interleaving parameters comprises:
      a write count to specify how many symbols for the low level interleaver to write without a corresponding read,
      a write/read count to specify how many symbols for the low level interleaver to write and read, and
      a read count to specify how many symbols for the low level interleaver to read without a corresponding write; and
   the set of high level interleaving signals comprises:
      a high level go signal to activate the high level interleaver.

9. A method of interleaving data with a plurality of frames per codeword utilizing the system in claim 8 wherein:
   each codeword contains S frames,
   each of the plurality of frames contains N/S symbols;
   each codeword contains N symbols;
   each codeword contains P payload symbols and R redundancy symbols,
said method comprising:
   A) initializing high level interleaver parameters comprising the substeps of:
      1) initializing the write count to zero,
      2) initializing the write/read count to (P/S), and
      3) initializing the read count to (R/S),
   B) activating the high level interleaver (S−1) times by asserting the high level interleaver go signal after step (A);
   C) initializing high level interleaver parameters comprising the substeps of:
      1) initializing the write count to (R/S)*(S−1),
      2) initializing the write/read count to (N/S), and
      3) initializing the read count to zero; and
   D) activating the high level interleaver by asserting a high level interleaver go signal after step (C).

10. The system in claim 1 wherein:
   the high level interleaver and the low level interleaver interleave ADSL data;
   each symbol is an eight bit byte; and
   N and D are relatively coprime integers.

11. The system in claim 1 wherein the low level interleaver comprises:
   a low level write circuit for controlling a writing of a symbol;
   a low level read circuit for controlling a reading of a symbol, and
   a low level controller for controlling the low level write circuit and the low level read circuit.

12. The system in claim 11 wherein the low level write circuit comprises:
a write address register containing a write address;
an ALU that receives the write address from the write address register and provides an updated write address to the write address register;
a MUX to select one of a plurality of parameter values as an input value to the ALU for a purpose of modifying the write address;
a write address comparator for determining when the write address exceeds a write address limit; and
a counter to determine when an entire frame of N symbols has been written.

13. The system in claim 12 wherein the low level controller comprises:
a write address fix circuit responsive to a write address overflow signal from the write address comparator that provides control signals to the MUX and the ALU to adjust the write address in the write address register to compensate for write address wraparound.

14. The system in claim 11 wherein the low level read circuit comprises:
a read address register containing a read address wherein:
the read address register is an incrementer that increments the read address for each read request to the low level read circuit; and
a read address comparator for determining when the read address exceeds a read address limit.

15. The system in claim 14 wherein the low level controller comprises:
a read address fix circuit responsive to a read address overflow signal from the read address comparator that provides a control signal to reinitialize the read address register to an initial read address value.

16. The system in claim 11 which further comprises:
an interleaver memory address register for providing a memory address to an interleaver memory,
a second MUX that selectively provides either a write address from a write address register or a read address from a read address register to the interleaver memory address register,
a write data register for providing a write data operand for writing to the write address in the interleaver memory, and
a read data register for receiving a read data operand read from the read address in the interleaver memory.

17. The system in claim 11 wherein:
the system further comprises:
an interleaver memory accessed by the low level interleaver;
the low level interleaver includes a read data register and a write data register; and
the set of low level interleaving signals comprises:
a write signal that selectively activates the low level write circuit to write a symbol from the write data register to the interleaver memory, and
a read signal that selectively activates the low level read circuit to read one symbol from the interleaver memory into the read data register.

18. The system in claim 11 wherein:
the low level write circuit comprises:
a write address register containing a write address,
an ALU that receives the write address from the write address register and provides an updated write address to the write address register,
a MUX to select one of a plurality of parameter values as an input value to the ALU for a purpose of modifying the write address,
a write address comparator for determining when the write address exceeds a write address limit, and
a counter to determine when an entire frame of N symbols has been written;
the low level read circuit comprises:
a read address register containing a read address wherein:
the read address register is an incrementer that increments the read address for each read request to the low level read circuit, and
a read address comparator for determining when the read address exceeds a read address limit; and
the low level controller comprises:
a write address fix circuit responsive to a write address overflow signal from the write address comparator that provides control signals to the MUX and the ALU to adjust the write address in the write address register to compensate for write address wraparound, and
a read address fix circuit responsive to a read address overflow signal from the read address comparator that provides a control signal to reinitialize the read address register to an initial read address value.

19. The system in claim 11 wherein:
the set of low level interleaving signals comprise:
a low level interleaver go signal to activate the low level interleaver,
a low level interleaver write signal to selectively activate the low level write circuit when the low level interleaver go signal is asserted, and
a low level interleaver read signal to selectively activate the low level read circuit when the low level interleaver go signal is asserted; and
the low level interleaver provides a low level interleaver done signal to the high level interleaver after the low level write circuit if selectively activated is done and the low level read circuit if selectively activated is done.

20. The system in claim 19 wherein:
the set of high level interleaving parameters comprises:
a write count to specify how many symbols for the low level interleaver to write without a corresponding read,
a write/read count to specify how many symbols for the low level interleaver to write and read, and
a read count to specify how many symbols for the low level interleaver to read without a corresponding write; and
an operation of the high level interleaver comprises the steps of:
activating the low level interleaver a first integer number of times specified by the write count by:
asserting the low level interleaver go signal with the low level interleaver write signal asserted and the low level interleaver read signal negated, and
waiting for the low level interleaver done signal,
activating the low level interleaver a second integer number of times specified by the write/read count by:
asserting the low level interleaver go signal with the low level interleaver write signal asserted and the low level interleaver read signal asserted, and
waiting for the low level interleaver done signal, and
activating the low level interleaver a third integer number of times specified by the read count by:

asserting the low level interleaver go signal with the low level interleaver write signal negated and the low level interleaver read signal asserted and waiting for the low level interleaver done signal.

21. A system for programmably deinterleaving communications data that separates deinterleaving operations at a codeword level from deinterleaving operations at a symbol level, wherein:

a codeword is an ordered grouping of N symbols to be deinterleaved to a depth of D;

said system comprising:

a high level deinterleaver that is responsive to a set of high level deinterleaving signals, that is controlled by a set of high level deinterleaving parameters, and which works at the codeword level; and a low level deinterleaver that is responsive to a set of low level deinterleaving signals provided by the high level deinterleaver, that is controlled by a set of low level deinterleaving parameters, and which works at the symbol level.

22. The system in claim 21 which further comprises:

a deinterleaver memory that is written by and read from the low level deinterleaver.

23. The system in claim 21 which further comprises:

a top level controller that provides the set of high level deinterleaving signals to the high level deinterleaver.

24. The system in claim 21 which further comprises:

a deinterleaver input buffer that is read by the high level deinterleaver; and a deinterleaver output buffer that is written by the high level deinterleaver.

25. The system in claim 24 wherein the deinterleaver input buffer is a same buffer as the deinterleaver output buffer.

26. The system in claim 21 wherein:

the set of low level deinterleaving signals comprise:
a low level deinterleaver write signal,
a low level deinterleaver read signal, and
a low level deinterleaver go signal to activate the low level deinterleaver; and the low level deinterleaver provides a low level deinterleaver done signal to the high level deinterleaver when it completes.

27. The system in claim 21 wherein:

the set of low level deinterleaving parameters comprises:
a deinterleaver buffer address,
a deinterleaving codeword size N,
a deinterleaving depth D, and
a deinterleaver memory address limit; and the set of low level deinterleaving signals comprises:
a low level go signal to activate the low level deinterleaver.

28. The system in claim 21 wherein:

the set of high level deinterleaving parameters comprises:
a write/read count to specify how many symbols for the low level deinterleaver to write and read, and the set of high level deinterleaving signals comprises:
a high level go signal to activate the high level deinterleaver.

29. A method of deinterleaving data with a plurality of frames per codeword utilizing the system in claim 28 wherein:

each codeword contains S frames,
each of the plurality of frames contains N/S symbols;
each codeword contains N symbols;
each codeword contains P payload symbols and R redundancy symbols, said method comprising:

A) accumulating the P payload symbols and R redundancy symbols from the S frames in an accumulation buffer;

B) initializing the write/read count to (P+R); and

C) activating the high level interleaver by asserting the high level deinterleaver go signal after steps (A) and (B) to deinterleave input data in the accumulation buffer.

30. The system in claim 21 wherein:

the high level deinterleaver and the low level deinterleaver deinterleave ADSL data;

each symbol is an eight bit byte; and

N and D are relatively coprime integers.

31. The system in claim 21 wherein the low level deinterleaver comprises:

a low level read circuit for controlling a reading of a symbol;

a low level write circuit for controlling a writing of a symbol, and a low level controller for controlling the low level read circuit and the low level write circuit.

32. The system in claim 31 wherein the low level read circuit comprises:

a read address register containing a read address;

an ALU that receives the read address from the read address register and provides an updated read address to the read address register;

a MUX to select one of a plurality of parameter values as an input value to the ALU for a purpose of modifying the read address;

a read address comparator for determining when the read address exceeds a read address limit; and a counter to determine when an entire frame of N symbols has been read.

33. The system in claim 32 wherein the low level controller comprises:

a read address fix circuit responsive to a read address overflow signal from the read address comparator that provides control signals to the MUX and the ALU to adjust the read address in the read address register to compensate for read address wraparound.

34. The system in claim 31 wherein the low level write circuit comprises:

a write address register containing a write address wherein:
the write address register is an incrementer that increments the write address for each write request to the low level write circuit; and a write address comparator for determining when the write address exceeds a write address limit.

35. The system in claim 34 wherein the low level controller comprises:

a write address fix circuit responsive to a write address overflow signal from the write address comparator that provides a control signal to reinitialize the write address register to an initial write address value.

36. The system in claim 31 which further comprises:

a deinterleaver memory address register for providing a memory address to a deinterleaver memory, a second MUX that selectively provides either a read address from a read address register or a write address from a write address register to the deinterleaver memory address register, a read data register for receiving a read data operand read from the read address in the deinterleaver memory, and a write data register for providing a write data operand written to the write address in the deinterleaver memory.

37. The system in claim 31 wherein:

the system further comprises:
   a deinterleaver memory accessed by the low level deinterleaver;

the low level deinterleaver includes a write data register and a read data register; and the set of low level deinterleaving signals comprises:
   a write signal that selectively activates the low level write circuit to write a symbol from the write data register to the deinterleaver memory, and
   a read signal that selectively activates the low level read circuit to read one symbol from the deinterleaver memory into the read data register.

38. The system in claim 31 wherein:

the low level read circuit comprises:
   a read address register containing a read address,
   an ALU that receives the read address from the read address register and provides an updated read address to the read address register,
   a MUX to select one of a plurality of parameter values as an input value to the ALU for a purpose of modifying the read address,
   a read address comparator for determining when the read address exceeds a read address limit, and
   a counter to determine when an entire frame of N symbols has been read;

the low level write circuit comprises:
   a write address register containing a write address wherein:
      the write address register is an incrementer that increments the write address for each write request to the low level write circuit, and
   a write address comparator for determining when the write address exceeds a write address limit; and the low level controller comprises:
   a read address fix circuit responsive to a read address overflow signal from the read address comparator that provides control signals to the MUX and the ALU to adjust the read address in the read address register to compensate for read address wraparound, and
   a write address fix circuit responsive to a write address overflow signal from the write address comparator that provides a control signal to reinitialize the write address register to an initial write address value.

39. The system in claim 31 wherein:

the set of low level deinterleaving signals comprise:
   a low level deinterleaver go signal to activate the low level deinterleaver,
   a low level deinterleaver read signal to selectively activate the low level read circuit when the low level deinterleaver go signal is asserted, and
   a low level deinterleaver write signal to selectively activate the low level write circuit when the low level deinterleaver go signal is asserted; and the low level deinterleaver provides a low level deinterleaver done signal to the high level deinterleaver after the low level read circuit if selectively activated is done and the low level write circuit if selectively activated is done.

40. The system in claim 39 wherein:

the set of high level deinterleaving parameters comprises:
   a write/read count to specify how many symbols for the low level deinterleaver to write and read; and an operation of the high level deinterleaver comprises the steps of:
   activating the low level deinterleaver an integer number of times specified by the write/read count by:
      asserting the low level deinterleaver go signal with the low level deinterleaver read signal asserted and the low level deinterleaver write signal asserted, and
      waiting for the low level deinterleaver done signal.

41. A system for programmably interleaving and deinterleaving communications data that separates interleaving and deinterleaving operations at a codeword level from interleaving and deinterleaving operations at a symbol level, wherein:

a codeword is an ordered grouping of N symbols to be interleaved to a depth of D;

said system comprising:
   a high level interleaver that is responsive to a set of high level interleaving signals, that is controlled by a set of high level interleaving parameters, and which works at the codeword level;
   a low level interleaver that is responsive to a set of low level interleaving signals provided by the high level interleaver, and which works at the symbol level;
   a high level deinterleaver that is responsive to a set of high level deinterleaving signals, that is controlled by a set of high level deinterleaving parameters, and which works at the codeword level; and
   a low level deinterleaver that is responsive to a set of low level deinterleaving signals provided by the high level deinterleaver, and which works at the symbol level.

* * * * *